US005780395A

United States Patent [19]
Sydansk

[11] Patent Number: 5,780,395
[45] Date of Patent: Jul. 14, 1998

[54] FOAM FOR IMPROVING SWEEP EFFICIENCY IN SUBTERRANEAN OIL-BEARING FORMATIONS

[75] Inventor: Robert D. Sydansk, Littleton, Colo.

[73] Assignee: Marathon Oil Company, Findlay, Ohio

[21] Appl. No.: 839,640

[22] Filed: Feb. 21, 1992

Related U.S. Application Data

[63] Continuation-in-part of Ser. No. 566,027, Aug. 10, 1990, Pat. No. 5,105,884.

[51] Int. Cl.[6] .................................................. C08J 9/06
[52] U.S. Cl. ..................... 507/202; 507/936; 507/903; 507/225; 523/130; 252/307
[58] Field of Search ..................... 252/307, 315.3, 252/315.4, 8.551; 521/149; 507/225, 202, 903, 936; 523/130

[56] References Cited

U.S. PATENT DOCUMENTS

| | | |
|---|---|---|
| 3,342,261 | 9/1967 | Bono . |
| 3,368,624 | 2/1968 | Heuer, Jr. et al. . |
| 3,490,533 | 1/1970 | McLaughlin . |
| 3,993,133 | 11/1976 | Clampitt . |
| 4,232,741 | 11/1980 | Richardson et al. . |
| 4,300,634 | 11/1981 | Clampitt . |
| 4,389,320 | 6/1983 | Clampitt . |
| 4,498,540 | 2/1985 | Marrocco . |
| 4,613,631 | 9/1986 | Eanscheid et al. . |
| 4,643,255 | 2/1987 | Sandiford et al. . |
| 4,665,986 | 5/1987 | Sandiford . |
| 4,676,316 | 6/1987 | Mitchell . |
| 4,683,949 | 8/1987 | Sydansk et al. . |
| 4,694,906 | 9/1987 | Hutchins et al. . |
| 4,830,108 | 5/1989 | Hazlett et al. . |
| 4,844,163 | 7/1989 | Hazlett et al. . |
| 5,026,735 | 6/1991 | Stern ................. 252/315.3 X |

Primary Examiner—Gary Geist
Attorney, Agent, or Firm—Jack L. Hummel; Jack E. Ebel

[57] ABSTRACT

A foam is provided having utility for improving sweep efficiency in subterranean oil-bearing formations and having specific utility for conformance improvement treatments and mobility control in such formations. The foam is a gel medium having a gas dispersed therein. The gel medium is made up of a crosslinkable polymer, a crosslinking agent, a surfactant and a liquid solvent.

5 Claims, No Drawings

FOAM FOR IMPROVING SWEEP EFFICIENCY IN SUBTERRANEAN OIL-BEARING FORMATIONS

CROSS-REFERENCE TO RELATED APPLICATIONS

This application is a continuation-in-part of U.S. patent application, Ser. No. 07/566,027, filed on Aug. 10, 1990, now U.S. Pat. No. 5,105,884.

BACKGROUND OF THE INVENTION

1. Technical Field

The invention relates to a process for recovering oil from a subterranean oil-bearing formation and more particularly to an oil recovery process utilizing a foam.

2. Background Information

The injection of displacement fluids into subterranean hydrocarbon-bearing formations to promote the production of hydrocarbons therefrom is well known. Water and various gases, in addition to more complex fluids, such as surfactant solutions and polymer solutions, are common displacement fluids utilized in both miscible and immiscible oil displacement floods.

The effectiveness of oil displacement floods is in part a function of the sweep efficiency of the displacement fluid. Sweep efficiency is substantially reduced by conformance problems in the formation and poor mobility characteristics of the displacement fluid. Conformance problems are generally characterized by the juxtaposition of high permeability and low permeability flow paths within a given formation. Conformance problems can be either fracture-type or matrix-type. Fracture-type conformance problems occur when there are simple fractures or fracture networks in communication with an injection and/or production well penetrating the formation. Matrix-type conformance problems occur when there are adjoining strata or regions of differing permeability within the formation.

When a displacement fluid is injected into a formation exhibiting conformance problems, the high permeability flow paths divert substantially all of the displacement fluid away from the low permeability flow paths. As a consequence, the displacement fluid does not sweep the low permeability flow paths and the sweep efficiency of the displacement fluid in the formation is poor.

Conformance problems can be corrected by a conformance improvement treatment (CIT) which effectively plugs or constricts the high permeability flow paths with a plugging material. By plugging or constricting formation flow paths having high permeability and low oil saturation, subsequently injected displacement fluid preferentially sweeps formation flow paths having low permeability and high oil saturation. Thus, the CIT improves the sweep efficiency of the displacement fluid, enables it to contact and displace more oil, and promotes ;Increased incremental oil recovery.

At present, gels are commonly used as a CIT plugging material. Polyacrylamide crosslinked with chromium III has been found to form gels which are effective for most CIT's as set forth in U.S. Pat. No. 4,683,949 to Sydansk et al. U.S. Pat. No. 4,683,949 describes the effective use of crosslinked acrylamide gels specifically made for treatment of fracture-type and matrix-type conformance problems. It has now been found that in some cases CIT's employing conventional gels are prohibitively expensive due to relatively high chemical costs. For example, where high permeability flow paths extend far out into the formation away from an injection and/or production well, the flow paths can consume a tremendous volume of gel before an effective level of permeability reduction is obtained therein. A point is reached where the chemical requirements of the CIT are so high that the improved incremental oil recovery obtained by the treatment does not offset the CIT cost. Beyond this point, CIT's employing such gels are no longer cost effective and have no economic utility.

In such cases, a process is desirable which is more cost effective than conventional CIT processes using gels as the plugging material. More particularly, a CIT process is needed which has lower chemical costs than conventional gel treatments, yet which is at least as effective as conventional gel treatments. Furthermore, a CIT process is needed which is economical under conditions where conventional gel treatments are not, such as when the high permeability flow paths are pervasive throughout the formation.

Conventional gels have not only been found to be uneconomic in certain CIT's, but have also been found to perform unsatisfactorily in certain other plugging treatments similar to CIT's. For example, gels are typically ineffective for selectively plugging vertical fractures which extend from an oil-bearing production zone into a gas cap. Unless such fractures are plugged, the gas will be readily drawn into the production zone when the zone is produced which creates an undesirable gas coning condition. Unfortunately, because of the density of conventional gels and the vertical orientation of the fractures, the gels are extremely difficult to selectively place in the upper portions of such fractures where plugging would be most effective for prevention of gas coning. Gravitational forces cause the gels either to enter less problematic, lower-reaching fractures which do not communicate with the gas cap or to ineffectively settle only into the lower portions of the fractures which communicate with the gas cap. As such, an effective treatment is needed for sufficiently plugging the vertical fractures between the gas cap and the oil production zone to prevent gas coning at the production well bore.

In addition to conformance problems, poor mobility characteristics of the displacement fluid can also diminish sweep efficiency in the formation. Poor mobility characteristics can be countered by employing mobility control fluids known in the art which are typically more viscous than the displacement fluid. However, conventional mobility control fluids have been found to be ineffective for sweeping oil-bearing fractures and particularly fractures containing water and gravity-segregated oil or fractures in fluid communication with an aquifer.

Conventional mobility control fluids tend to preferentially sweep out water lying beneath the oil, which is denser than the oil, while leaving the oil behind. A process is needed which employs a more effective mobility control fluid for efficiently sweeping oil from a subterranean oil-bearing formation and particularly from oil-bearing fractures containing gravity-segregated oil or from oil-bearing fractures in fluid communication with an aquifer.

SUMMARY OF INVENTION

The present invention is a process utilizing a low-density foam to improve sweep efficiency in a subterranean oil-bearing formation. The foam comprises a liquid solvent, a polymer, a crosslinking agent, a surfactant and a foaming gas. The foam is prepared by combining the polymer, crosslinking agent, and surfactant in solution with the solvent to form a liquid foaming composition, introducing the foaming gas into the liquid foaming composition, and crosslinking the polymer to completion.

According to one embodiment of the invention, the foam is substituted for a conventional gel in a CIT process to overcome either matrix-type or fracture-type conformance problems. The invention is particularly advantageous over known gel treatment processes because the foam provides a considerable reduction in chemical costs relative to gels without significantly reducing the effectiveness of the CIT. A foam can occupy the same volume as a gel at a much lower cost because gas, which is much cheaper than gel, makes up a significant volumetric fraction of the foam. Nevertheless, the foam retains the necessary strength and structure to effectively perform as a CIT plugging material despite its significant gas fraction.

In a related embodiment of the present invention, the low-density foam is employed to prevent gas coning near a production well bore caused by gas entering the near well bore via vertical fractures in fluid communication with a gas cap and a producing zone. The foam treatment is effective where gel treatments or treatments with other conventional plugging materials fail because the low-density foam preferentially enters and floats to the top of gas coning fractures. The foam sets up in the upper portions of the fractures and substantially blocks the flow of gas into the oil-producing zone during production thereof.

According to another embodiment of the present invention, the foam disclosed herein has utility as a mobility control fluid in conjunction with displacement flooding of either oil-producing fractures or matrix. The foam is injected into a subterranean oil-bearing formation undergoing a displacement flood, which is ineffective due to fingering or other flooding nonuniformities, to render the flood front more uniform and improve sweep efficiency. The low-density foam is particularly effective for sweeping oil-bearing fractures which contain both water and gravity-segregated oil or oil bearing fractures which are in fluid communication with a subterranean aquifer. The low-density foam preferentially sweeps the less dense oil in place above the water.

The low-density foam is also effective as a mobility control fluid in conjunction with gas floods, including $CO_2$, $N_2$, steam floods and the like, whether hydrocarbon miscible or immiscible. The low-density foam reduces override of the gas flood front in oil-bearing fractures or matrix by forcing the flood to sweep the oil in place in the lower portions of the fractures or matrix.

The foam used in the present invention can be tailored over a broad range of chemical and physical properties to satisfy the requirements of the given formation. Specifically, a foam can be prepared which is either flowing or nonflowing. More specifically, a flowing foam can be prepared which has a viscosity ranging from below that of water to considerably higher than the viscosity of water. Likewise, a nonflowing foam can be prepared which ranges in physical character from highly elastic to rigid. A foam can also be prepared within a broad range of densities to enhance selective vertical placement of the foam within an oil or gas reservoir. A foam can preferentially be prepared which has a density less than water and more preferentially which has a density approximating the density of the oil or gas in place.

DESCRIPTION OF THE PREFERRED EMBODIMENTS

In a first embodiment, the present invention is a conformance improvement treatment process employing a foam. In a second embodiment, the invention is a plugging treatment to prevent gas coning. In yet another embodiment, the invention is a mobility control process employing a foam. The present mobility control process has particular utility for sweeping oil-bearing fractures with a low-density foam and more particularly, fractures containing water and gravity-segregated oil or fractures in fluid communication with subterranean aquifers. The mobility control process also has utility for reducing override in gas floods.

In general, the CIT and related plugging treatment are static applications of the foam, in that the foam remains substantially stationary in the formation once it is placed therein. The mobility control process is a dynamic application of the foam, in that the foam moves across the formation in correspondence with a flood front.

A foam is commonly defined as a composition comprising a gas phase dispersed throughout a surrounding medium, such as a liquid. The foam as specifically disclosed herein is characterizable in bulk as a gas phase dispersed throughout a surrounding gel medium. The term "gel" as used herein is directed to a continuous three-dimensional crosslinked polymeric network integrating a liquid into the interstices of the network.

The foam utilized in the present invention comprises a crosslinkable polymer, a crosslinking agent, a liquid solvent, a surfactant, and a gas. "Crosslinkable polymer" and "polymer" as utilized throughout this specification interchangeably refer to a water-soluble, carboxylate-containing synthetic polymer or biopolymer. A preferred carboxylate-containing synthetic polymer is an acrylamide-containing polymer having one or more carboxylate groups or, alternatively having one or more groups capable of being hydrolyzed to carboxylate groups, e.g., amide groups. Of the acrylamide-containing polymers, the most preferred are polyacrylamide (PA), partially hydrolyzed polyacrylamide (PHPA), copolymers of acrylamide and acrylate, and carboxylate-containing terpolymers of acrylate. PA, having utility herein, has from about 0.1% to about 3% of its amide groups hydrolyzed. PHPA, as defined herein, has greater than about 3% of its amide groups hydrolyzed. Carboxylate-containing biopolymers useful in the present invention include polysaccharides and modified polysaccharides. Exemplary carboxylate-containing biopolymers are xanthan gum, guar gum, succinoglycan, scieroglucan, polyvinylsaccharides, carboxymethylcellulose, o-carboxychitosans, hydroxyethylcellulose, hydroxypropylcellulose, and modified starches.

The crosslinking agent of the present invention effects crosslinking between the carboxylate sites of the same or different polymer molecules. Crosslinking of the polymer creates the gel medium which gives the foam a network structure. The crosslinking agent is preferably a molecule or complex containing a reactive transition metal cation. A preferred crosslinking agent comprises a trivalent chromium cation complexed or bonded to an anion, oxygen or water. Exemplary preferred crosslinking agents are chromic triacetate ($CrAc_3$) and chromic trichloride. Chromic triacetate crosslinking agents are taught in U.S. Pat. No. 4,683,949 which is incorporated herein by reference. Other transition metal cations, which are found in crosslinking agents, having utility in the present invention, although less preferred, are chromium VI within a redox system, aluminum III within aluminum citrate or aluminum trichloride, iron II, iron III, and zirconium IV.

The liquid solvent may be any liquid in which the polymer, crosslinking agent and surfactant can be dissolved, mixed, suspended or otherwise dispersed to facilitate gel formation. The solvent is preferably an aqueous liquid such as fresh water or a brine, such as a brine produced from a subterranean formation.

The surfactant may be substantially any conventional anionic, cationic or nonionic surfactant which is distributed throughout the gel medium to reduce the surface tension between the solvent and the gas. Anionic, cationic and nonionic surfactants are well known in general and are commercially available. Unlike conventional oil recovery foams, the present foam, which is applicable to CIT's and mobility control processes, has been found to be relatively insensitive to the chemistry of the employed surfactants. Specific surfactants having utility in the present invention include ethoxylated sulfates, ethoxylated alcohols, petroleum sulfonates, refined sulfonates, synthetic sulfonates and alpha olefin sulfonates.

The gas may be substantially any foaming gas which is substantially nonreactive with the above-recited polymer, crosslinking agent, and surfactant components and which is capable of being dispersed throughout the liquid medium. Examples of foaming gasses having utility herein are nitrogen, methane, carbon dioxide, nitrous oxide, air, natural gas, produced gas, steam, and flu gas. Nitrogen, produced gas or natural gas are preferably used in production of the present foams.

The foam of the present process can be prepared by mixing the components in substantially any order and manner. However, the foam is preferably prepared by first making a liquid foaming composition, which combines the polymer, crosslinking agent and surfactant in the liquid solvent. The polymer and crosslinking agent are combined in relative proportions for example as taught by U.S. Pat. No. 4,683,949. The surfactant is combined in the liquid foaming composition in a concentration of about 10 ppm to about 50,000 ppm, preferably about 100 ppm to about 10,000 ppm, and most preferably about 200 ppm to about 8,000 ppm. The polymer, crosslinking agent, solvent and surfactant may be combined in any order to form the liquid foaming composition. Typically, the liquid foaming composition is prepared by mixing discrete solutions of the polymer, crosslinking agent, and surfactant.

The foam is completed by adding the gas to the liquid foaming composition. The gas can be added to the liquid foaming composition by conventional means such as sparging, high speed mixing, or simultaneously flowing gas and liquid foaming composition through an orifice(s) or solid packing, such as a sand or gravel pack. The foam can be formed at the surface by premixing the gas with the liquid foaming composition prior to injection or the foam can be formed in-situ by sequential injection or coinjection of the gas and the liquid foaming composition into the formation and mixing of the two therein.

The integral components of the resulting foam are the gel medium and the gas dispersed therein. The gel medium is formed from the liquid foaming composition by crosslinking the polymer and a crosslinking agent. Crosslinking, or gelation as it is alternatively termed, is initiated as soon as the polymer and crosslinking agent contact and proceeds until either the crosslinking agent or the crosslinking sites are consumed. The crosslinked polymer forms the structural network of the gel medium and the liquid solvent forms the interstitial liquid of the medium.

The gel medium is integral to the foam and substantially enhances the structure and stability of the foam. The gas is preferably added to the liquid foaming composition before crosslinking is completed; i.e., while the gel medium is immature. However, foams may be formed from a liquid foaming composition which has already crosslinked to completion, i.e., after the gel medium has reached maturity, as long as the gel medium remains flowing. When the foaming gas is added to the liquid foaming composition before crosslinking has gone to completion, i.e., to maturity, crosslinking continues after formation of the foam, thereby enabling the structure of the gel medium to conform to the dispersed gas bubbles.

The physical properties of the foam are a function of the specific foam components and their relative proportions. Foams can be made by selecting values of the above-recited variables to create either flowing or nonflowing foams across a range of viscosities and densities as desired. A flowing foam is defined herein as a foam which flows in the formation under forces concurrent with normal hydrocarbon production operations, while a nonflowing foam is one which will not flow in the formation under such forces. Within the range of nonflowing foams are rigid foams to highly elastic foams. Within the range of flowing foams are highly viscous foams to foams less viscous than water.

As is known in the art, one prepares a CIT or mobility control material having predetermined properties to meet the requirements of the subterranean formation being treated or flooded respectively. It has been found that foams having substantially the same performance characteristics as corresponding gels can be formed despite the relatively high gas volume of the foams. Furthermore, in many applications, foam performance does not significantly diminish as the volumetric gas content of foam increases.

The gas content of the foam, termed foam quality, is expressed as the volume percent of gas in the foam. Foams generally have utility in the present process which have a quality between about 50% and about 99%, preferably between about 60% and about 98%, and most preferably between about 75% and about 97%. Thus, it is apparent that the present foams can be tailored to meet the specific performance requirements of the given application and subterranean formation. The foams are tailored simply by selecting the specific foam components and adjusting their relative proportions within the ranges recited herein.

Once a foam is prepared according to the process described herein, it can be substituted for and used in the same manner as conventional CIT plugging materials, such as gels, cements, or the like. The flowing foams have further utility as a mobility control fluid and can be substituted for substantially any conventional mobility control fluid. For the reasons set forth herein, performance of the present foam is superior in many cases to that of conventional CIT plugging materials or mobility control fluids, for which the foam is substituted.

When applied to CIT's and related plugging treatments, the foam is preferably a nonflowing foam having sufficient strength to remain in place under the injection or production pressures typically encountered during the oil production once the foam is fully matured. However, such foams are initially in a flowing condition when immature to enable placement in the desired treatment region. Foams applied to the plugging of fractures for prevention of gas coning also preferably have a density less than the oil in place to facilitate placement of the foam between the formation and the gas cap.

When foams are used as mobility control fluids for fracture flooding or for gas override reduction, the foams are flowing. Such flowing foams preferably have a viscosity greater than water, but have a specific gravity less than the formation water. A preferred viscosity range for the flowing foam in such applications is from about 1.0 cp to about 5000 cp with an accompanying specific gravity range from about 0.5 to about 0.01. The most preferred viscosity range is from about 10 cp to about 500 cp and the accompanying specific gravity range is from about 0.3 to about 0.03.

An exception to the above-recited preferred specific gravity ranges is a foam having $CO_2$ as the foaming gas. Such foams may have a specific gravity which preferentially exceeds 0.5.

The following examples demonstrate the practice of the present invention but are not to be construed as limiting the scope thereof.

EXAMPLE 1

A flooding experiment is performed at a constant low pressure and ambient temperature in a 30.5 cm long, 91,000 md Ottawa test sandpack which is at residual water saturation (essentially 100% oil saturation) with a crude oil and a synthetic brine. The synthetic brine is a saline oilfield-produced water having 10,300 ppm total dissolved solids and 520 ppm hardness. The single sandpack functions as both a foam generator and a test pack.

Nitrogen and a liquid foaming composition are coinjected into the sandpack to form a foam. In sum, about 9 pore volumes of the foam are ultimately injected into the sandpack before it is shut in and the foam is allowed to mature.

The liquid foaming composition contains 9,000 ppm PA having a molecular weight of 11,000,000 and 2% hydrolysis, 170 ppm chromium III ion concentration in the form of a chromic carboxylate complex, and 3,000 ppm alpha olefin sulfonate surfactant ($C_{12-14}$—C=C—$SO_3Na$) in a synthetic brine solvent. The synthetic brine solvent has the same composition as set forth above. The foam quality of the initially-produced foam is 96%, which is reduced to 64% prior to termination of the coinjection. The in situ apparent viscosity of the essentially immature foam ranges from 230 cp at 96% foam quality to 310 cp at 64% foam quality.

After the foam matures, the sandpack is flooded for 174 hours with the synthetic brine at 172 kPa differential pressure. The measured permeability reduction is $k_f/k_i < 7 \times 10^{-8}$ ($k_f < 0.006$ md). Thereafter, injection of nitrogen into the sandpack is attempted for 144 hours at a differential pressure of 68.9 kPa. No detectable fluid or gas production is observed during the injection of nitrogen.

EXAMPLE 2

A 122 cm long, 130,000 md, 20–30 mesh Ottawa test sandpack is prepared at residual oil saturation with a crude oil and the synthetic brine of Example 1. Approximately 11 pore volumes of substantially the same foam as Example 1 under the same conditions are injected into the sandpack.

During the third pore volume of injection, foam quality is 93% and the apparent in situ viscosity of the immature foam is 190 cp. During the fifth pore volume of foam injection, the foam quality is 77% and the apparent in situ viscosity of the immature foam is about 370 cp. Upon termination of injection, the foam quality is 88%.

After flooding is terminated, the foam is allowed to age for a period of time. Thereafter, the sandpack is flooded with a synthetic production brine at 172 kPa psi differential pressure for 120 hours. The measured permeability reduction is $k_f/k_i = 8 \times 10^{-7}$ ($k_f = 0.10$ md). Injection of nitrogen is then attempted for 120 hours at a differential pressure of 345 kPa. 1 $cm^3$ of gas is produced primarily during the first 4 hours of injection.

The results of Examples 1 and 2 indicate that the performance of the foamed gels is not highly sensitive to foam quality or oil saturation. The present process has utility over a range of foam qualities.

EXAMPLE 3

Two sandpacks are flooded in series. The first sandpack is 15.2 cm long and the second sandpack is 122 cm long. The second sandpack models a propped fracture and is at residual oil saturation with a crude oil and a synthetic brine. The synthetic brine is a saline olifield-produced water having 5800 ppm total dissolved solids, 740 ppm hardness and 2200 ppm sulfate ion concentration. The second sandpack has an effective permeability to brine at residual oil saturation of about 100,000 md. A liquid foaming composition is prepared containing 9,000 ppm PHPA which has a molecular weight of 11,000,000 and is 30 mole % hydrolyzed. The liquid foaming composition contains 3,000 ppm alpha olefin sulfonate surfactant in the synthetic brine and a chromic acetate crosslinking agent which has a PA:$CrAc_3$ weight ratio of 12:1. The foaming gas is nitrogen.

About 6 pore volumes of the foam are injected into the sandpacks at ambient temperature and pressure. The first sandpack acts as the foam generator and the second sandpack acts as the treatment region for evaluating foam properties and plugging efficiency. The foam is allowed to mature in the second sandpack. Injection of nitrogen at 345 kPa differential pressure is attempted for 14 days thereafter with no detectable gas throughput or foam production.

EXAMPLE 4

A series of two sandpacks are provided in the same manner as Example 3 and injected with about 4.5 pore volumes of foam wherein the liquid foaming composition is substantially that of Example 2. The foam is then allowed to mature. Injection of nitrogen at 345 kPa differential pressure is first attempted for 336 hours with no detectable gas or foam production. Thereafter, injection of nitrogen is attempted at 517 kPa differential pressure for 216 hours, again with no detectable gas or foam produced.

The above-recited examples demonstrate the plugging efficiency of the present foams for blocking the flow of formation brines or gas in CIT's as well as for gas coning prevention. Prior to maturity, the flowing foams also exhibit substantial in situ viscosities rendering them effective as mobility control fluids for fracture flooding or gas override prevention.

While the foregoing preferred embodiments of the invention have been described and shown, it is understood that alternatives and modifications, such as those suggested and others, may be made thereto and fall within the scope of the invention.

I claim:

1. A foam composition for improving sweep efficiency in a subterranean oil-bearing formation comprising:
    a synthetic polymer selected from polyacrylamide, partially hydrolyzed polyacrylamide, copolymers of acrylamide and acrylate, carboxylate-containing terpolymers of acrylamide, or mixtures thereof;
    a trivalent chromium-containing crosslinking agent;
    a surfactant;
    an aqueous liquid solvent, the combination of said synthetic polymer, said crosslinking agent and said surfactant in said solvent defining a liquid foaming composition; and
    a foaming gas.

2. The composition of claim 1 wherein said crosslinking agent is a chromic carboxylate complex.

3. The composition of claim 2 wherein the weight ratio of said polymer to said crosslinking agent is about 1:1 to about 500:1.

4. The composition of claim 3 wherein the weight ratio of said polymer to said crosslinking agent is about 2.5:1 to about 100:1.

5. The composition of claim 4 wherein the weight ratio of said polymer to said crosslinking agent is about 5:1 to about 40:1.

* * * * *